US007045753B1

(12) United States Patent
Fox

(10) Patent No.: US 7,045,753 B1
(45) Date of Patent: May 16, 2006

(54) FIVE TRANSISTOR CMOS PIXEL

(75) Inventor: Eric Charles Fox, Waterloo (CA)

(73) Assignee: Dalsa, Inc., Ontario (CA)

( * ) Notice: Subject to any disclaimer, the term of this patent is extended or adjusted under 35 U.S.C. 154(b) by 0 days.

(21) Appl. No.: 10/434,285

(22) Filed: May 9, 2003

Related U.S. Application Data

(63) Continuation-in-part of application No. 09/722,609, filed on Nov. 28, 2000, now abandoned.

(60) Provisional application No. 60/223,966, filed on Aug. 9, 2000.

(51) Int. Cl.
*H01L 27/00* (2006.01)

(52) U.S. Cl. .................................... 250/208.1; 348/308

(58) Field of Classification Search ................ 257/291, 257/298, 292, 443, 444; 348/380, 294, 298, 348/297, 308, 296, 321, 367, 362, 300, 301, 348/302, 303; 250/208.1, 214 R, 214 P
See application file for complete search history.

(56) References Cited

U.S. PATENT DOCUMENTS

| 5,146,480 | A | 9/1992 | Sankaranarayanan et al. 377/60 |
| 5,760,723 | A | 6/1998 | McGrath et al. ............ 341/143 |
| 5,867,215 | A | 2/1999 | Kaplan ....................... 348/315 |
| 5,881,184 | A | 3/1999 | Guidash ..................... 382/321 |
| 5,900,623 | A | 5/1999 | Tsang et al. ............. 250/208.1 |
| 6,002,123 | A | 12/1999 | Suzuki .................... 250/208.1 |
| 6,115,065 | A | 9/2000 | Yadid-Pecht et al. ....... 348/308 |
| 6,133,563 | A | 10/2000 | Clark et al. ............. 250/208.1 |
| 6,215,113 | B1 | 4/2001 | Chen et al. ............. 250/208.1 |
| 6,326,230 | B1 | 12/2001 | Pain et al. .................... 438/57 |
| 6,339,248 | B1* | 1/2002 | Zhao et al. ................. 257/461 |
| 6,437,379 | B1 | 8/2002 | Kopley et al. ............. 257/291 |
| 6,445,022 | B1 | 9/2002 | Barna et al. ............... 257/292 |
| 6,522,357 | B1* | 2/2003 | Beiley et al. .............. 348/296 |

FOREIGN PATENT DOCUMENTS

EP      1 152 472 A2    7/2001

* cited by examiner

*Primary Examiner*—David Zarneke
*Assistant Examiner*—Dana Farahani
(74) *Attorney, Agent, or Firm*—Millen, White, Zelano & Branigan

(57) ABSTRACT

A pixel includes five transistors, a photodetector and a storage node. A first transistor is coupled between the photodetector and the storage node. A second transistor includes a second transistor source and a second transistor drain. The second transistor source is coupled to the storage node. The second transistor drain is coupled to an output drain voltage. A third transistor includes a third transistor drain. The third transistor is coupled between the photodetector and a pixel reset voltage. The third transistor drain is coupled to the pixel reset voltage. The pixel reset voltage is different than the output drain voltage.

14 Claims, 8 Drawing Sheets

IMMEDIATELY AFTER SIGNAL TRANSFER

EXPOSURE CONTROL ENABLED

PHOTOSITE HARD RESET

PHOTOSITE SOFT RESET

SIGNAL INTEGRATION

FIVE TRANSISTOR CMOS PIXEL

BACKGROUND OF THE INVENTION

This application is a continuation-in-part application of U.S. Ser. No. 09/722,609 filed Nov. 28, 2000 now abandoned which claims the benefit of the Aug. 9, 2000 filing date of provisional application 60/223,966.

FIELD OF THE INVENTION

The present invention relates to an electronic camera with a fully integrated (no external shutter). In particular, the invention relates to a pixel architecture that eliminates issues associated with fat zeros, image lag, and sensitivity to pixel to pixel variations in the threshold voltage of the transfer gate transistors that show up as fixed pattern noise.

DESCRIPTION OF RELATED ART

FIGS. 2A and 2B are circuit schematics of conventional CMOS pixels known as a 3T pixel (for three transistor pixel) and a 4T pixel (for four transistor pixel). The 3T pixel has a reverse biased photodiode coupled between substrate voltage VSUB and the reset gate transistor. When operated, an RST signal applied to the electrode of the reset gate transistor causes a reverse bias to be set on the photodiode equal to output drain voltage VOD less VSUB. Between drain supply VDD and output signal terminal OUT is coupled two series transistors. The drain of a first transistor is coupled directly to VDD, and a gate of the first transistor is coupled to the cathode of the photodiode so that the first transistor operates as a source follower. The source of the source follower transistor is coupled through a row transistor to output terminal OUT. In applications, plural such 3T pixels are coupled to the same output terminal OUT. By selectively applying row address signal ROW to the gate of the selected row transistor, different pixels can be coupled to output terminal OUT. The 4T pixel (FIG. 2B) is like the 3T pixel (FIG. 2A) except that the 4T transistor has a transfer gate transistor coupled between the reset transistor and the photodiode so that a sense node may be created between the transfer transistor and the reset transistor and the sense node may be isolated from the photosite.

There is a need to capture fast changing scenes without the intrusion of a "rolling shutter" artifact while at the same time allowing for antiblooming and/or exposure control functionality. Further, there is a need to operate the pixel without image lag and with minimal fixed pattern noise due to variations in the fat zero signal. Known cameras use external shutters, mechanical or otherwise, to eliminated the rolling shutter artifacts.

U.S. Pat. No. 5,900,623 to Tsang, et al. describes a five transistor pixel with two transistors arranged as a differential pair. However, operation of the Tsang, et al. pixel requires that complementary signals be applied to FETS in a differential configuration, and that photocharge be accumulated on capacitor MCAP at a drain of one of the differentially configured FETS. The Tsang, et al. pixel does not allow for electronically "shuttered" image acquisition.

U.S. Pat. No. 6,115,065 to Yadid-Pecht and Fossum describes a pixel with four transistors and a photogate in a configuration of a 4T pixel. This pixel does not provide protection against a rolling shutter artifact (as described herein) at the same time as antiblooming and exposure control.

U.S. Pat. No. 5,881,184 to Guidash describes a pixel with a transistor to allow resetting of a sense/storage node on a pixel by pixel basis. However, the pixel does not provided antiblooming functionality at the same time as it provides protection against the rolling shutter artifact.

U.S. Pat. No. 6,002,123 to Suzuki describes a 4T pixel. However, the pixel does not provided antiblooming functionality at the same time as it provides protection against the rolling shutter artifact. Further, Suzuki does not describe the hard/soft reset sequences describe in the present patent.

U.S. Pat. No. 5,867,215 to Kaplan describes a CCD spill architecture that allows for enhanced dynamic range. However, the pixel does not provided antiblooming functionality and does not describe the hard/soft reset sequences describe in the present patent.

U.S. Pat. No. 5,760,723 to McGrath et al. describes a CCD spill well architecture that makes use of a fill and spill methodology. However, McGrath et al. do not describe a hard/soft reset methodology that removes image lag by the hard reset and minimizes noise with the soft reset.

SUMMARY OF THE INVENTION

The present invention advantageously serves to provide a fully integrated (no external shutter) and electronically adjustable sensor. Furthermore, the present invention advantageously serves to eliminate rolling shutter artifacts while providing antiblooming and exposure control functionality. Further still, the present invention advantageously serves to eliminate image lag while reducing fixed pattern noise.

These and other advantages are achieved in a pixel that includes five transistors, a photodetector and a storage node. A first transistor is coupled between the photodetector and the storage node. A second transistor includes a second transistor source and a second transistor drain. The second transistor source is coupled to the storage node. The second transistor drain is coupled to an output drain voltage. A third transistor includes a third transistor drain. The third transistor is coupled between the photodetector and a pixel reset voltage. The third transistor drain is coupled to the pixel reset voltage. The pixel reset voltage is different than the output drain voltage.

Alternatively, these and other advantages are achieved in a sensor that includes a pixel havings five transistors, a photodetector and a storage node. A first transistor is coupled between the photodetector and the storage node. A second transistor is coupled between the photodetector and a pixel reset voltage. A gate electrode of the first transistor is coupled to a transfer clock signal, and the transfer clock signal has a low state and a high state. A gate electrode of the second transistor is coupled to a pixel reset clock signal, and the pixel reset clock signal has a low state and a high state. The transfer clock signal and the pixel reset clock signal are both at a low state during a charge integration interval. The high state of the transfer clock signal is greater than the high state of the pixel reset clock signal.

Alternatively, these and other advantages are achieved in a sensor that includes control circuitry and a plurality of pixels. Each pixel includes five transistors, a photodetector and a storage node. A first transistor of each pixel is coupled between a respective photodetector and a respective storage node. A second transistor of each pixel is coupled between the respective storage node and an output drain voltage. A third transistor of each pixel is coupled between the respective photodetector and a pixel reset voltage. The control circuitry is capable of controlling the first transistor of each pixel to transfer a prior charge from the photodetector to the storage node at a beginning of a first readout interval. The control circuitry is further capable of controlling the first and third transistors of each pixel to integrate a first charge on the respective photodetector during an integration fraction of the first readout interval. The integration fraction is less than a whole of the first readout interval.

Alternatively, these and other advantages are achieved in another sensor that includes control circuitry and a plurality of pixels. Each pixel includes five transistors, a photodetector and a storage node. A first transistor of each pixel is coupled between a respective photodetector and a respective storage node. A second transistor of each pixel is coupled between the respective storage node and an output drain voltage. A third transistor of each pixel is coupled between the respective photodetector and a pixel reset drain. The control circuitry is capable of controlling the first transistor to transfer a prior photodetector charge from the photodetector to the storage node. The control circuitry is further capable of applying a pixel reset voltage to the pixel reset drain and controlling the third transistor to set a first photodetector charge on the photodetector based on the pixel reset voltage.

BRIEF DESCRIPTION OF DRAWINGS

The invention will be described in detail in the following description of preferred embodiments with reference to the following figures wherein.

The potentials depicted in FIGS. 3A through 3H and 7A through 7H use conventional n-channel potential diagrams. In these diagrams, more positive potentials are depicted toward the bottom of the figure, and less positive potentials are depicted toward the top of the figure. For example, a zero voltage reference may be depicted at the top of the potential diagram, and a +3 volt signal would be a step down toward the bottom of the figure with respect to the zero volt reference. A +5 volt signal would be a further step down toward the bottom of the figure with respect to both the +3 volt signal and the zero volt reference.

DETAILED DESCRIPTION OF PREFERRED EMBODIMENTS

The present invention achieve a fully integrated (no external shutter) and electronically adjustable sensor by adding one transistor to a known 4T pixel and controlling the clocking voltages as described herein. The operation of the sensor of this invention eliminates rolling shutter artifacts while providing antiblooming and exposure control functionality and also eliminates image lag while reducing fixed pattern noise.

Figure 1:
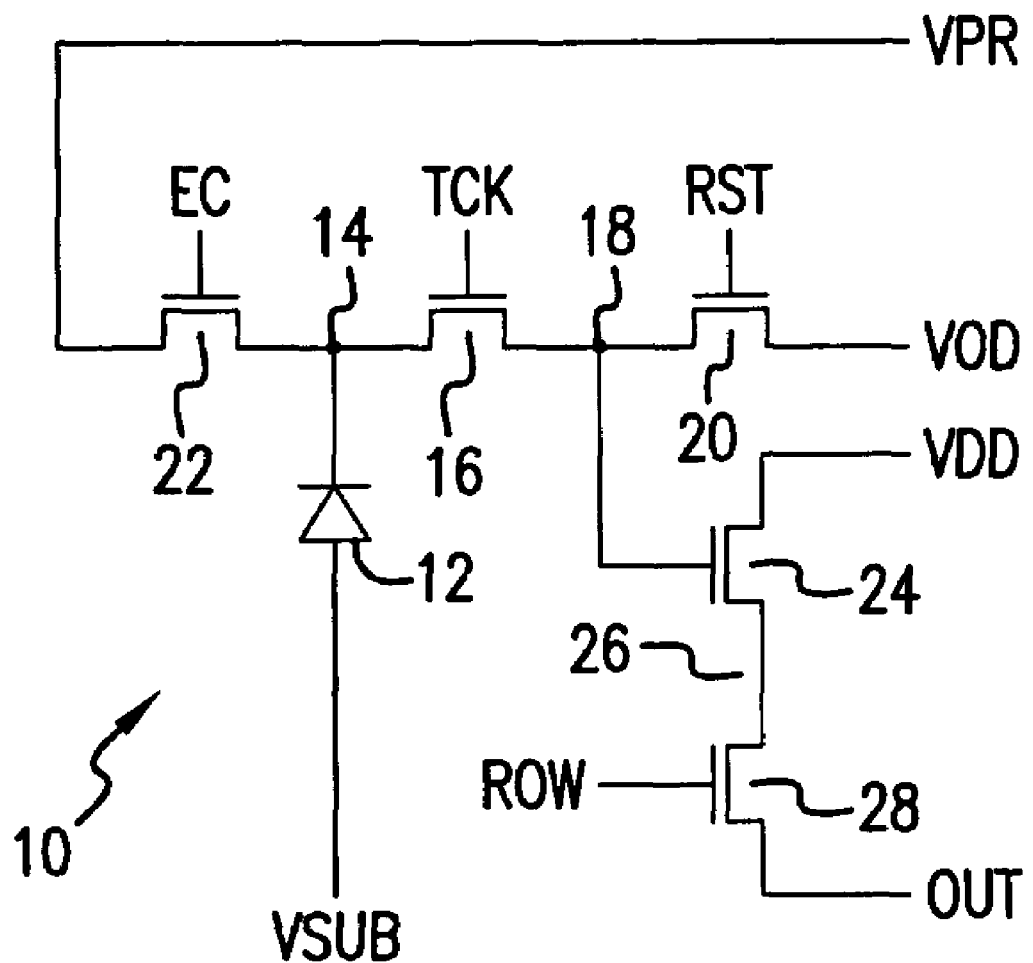
FIG. 1 is a circuit schematic of a five transistor pixel according to the present invention.

In FIG. 1, a new pixel includes a light shield (not shown in FIG. 1 for clarity) over top of a sense node (i.e., junction 18) and exposure control gate transistor 22 off of the photosite. The sense node (junction 18) includes the diode region between reset gate transistor 20 and transfer gate transistor 16. However, the light shield (not shown in the circuit schematic for clarity) prevents generation of photo charge in the sense node. Advantages of this pixel are that the pixel can be implemented in such a way that the "rolling shutter" problem associated with conventional CMOS image sensors can be eliminated while at the same time allowing for antiblooming (AB) operation and electronic exposure control (EC) operation. The new pixel is a 5-transistor architecture ("5T"). In contrast, a "4T" pixel can be operated to either eliminate rolling shutter problem or allow for AB/EC functionality, but not both at the same time.

Another feature of the 5T pixel is the specific timing and biasing sequence used such that this pixel can be operated with both low lag and low fixed pattern noise.

In FIG. 1, improved 5T pixel 10 includes a photodetector, in this example, a reverse biased photodiode 12 coupled between substrate voltage VSUB and junction 14. Transfer gate transistor 16 is coupled between junctions 14 and 18 and has a gate electrode controlled by transfer clock TCK. Reset gate transistor 20 is coupled between junction 18 and drain voltage VOD and has a gate electrode controlled by reset clock RST. Exposure control transistor 22 is coupled between junction 14 and preset voltage VPR (also called pixel reset voltage) and has a gate electrode controlled by exposure control voltage EC. Source follower transistor is coupled between drain voltage VDD and junction 26 and has a gate electrode coupled to junction 18. Row address transistor 28 is coupled between junction 26 and pixel output terminal OUT and has a gate electrode coupled to row addressing voltage ROW. Plural such pixels 10 are connected to output terminal OUT; however, the row addressing voltage ROW from only one pixel at a time is permitted to couple a signal from junction 26 to output OUT.

In general operation, exposure control transistor 22 sets voltage VPR on junction 14 while either the transfer gate transistor, the reset gate transistor, or both are turned off. Then photocharge is integrated on junction 14 and subsequently transferred to the gate electrode of source follower 24. The detailed method of operation is referred to as a hard/soft reset. The photosite is first "hard" reset with a dc bias (e.g., voltage VPR), and is then "soft" reset by spilling excess charge over the reset gate. CCD image sensors, in contrast to CMOS sensors, use a related technique referred to as "fill and spill".

Figure 3A:
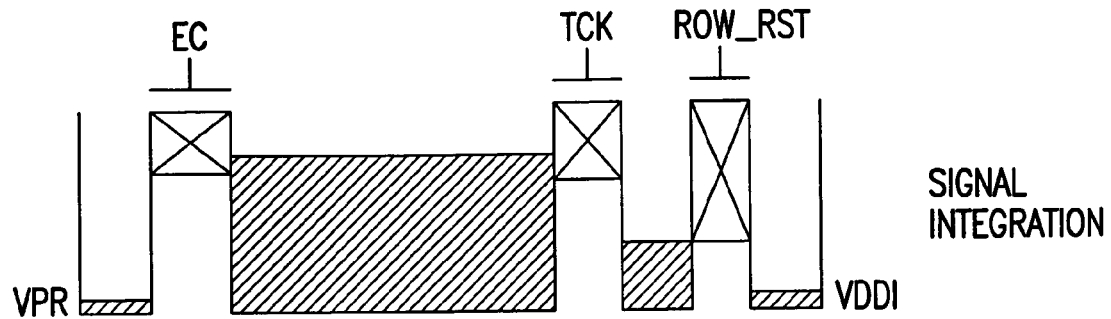
FIGS. 3A through 3C are potential diagrams illustrating collected charge transfer from the photodetector to the sense node according to the invention.
Figure 3B:
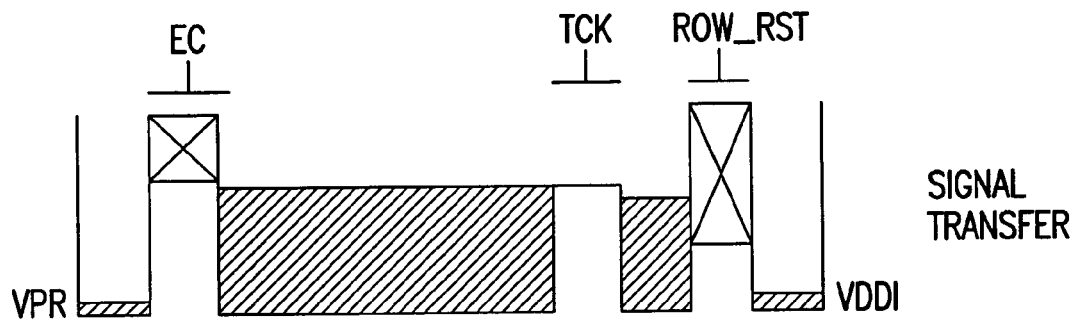
Figure 3C:
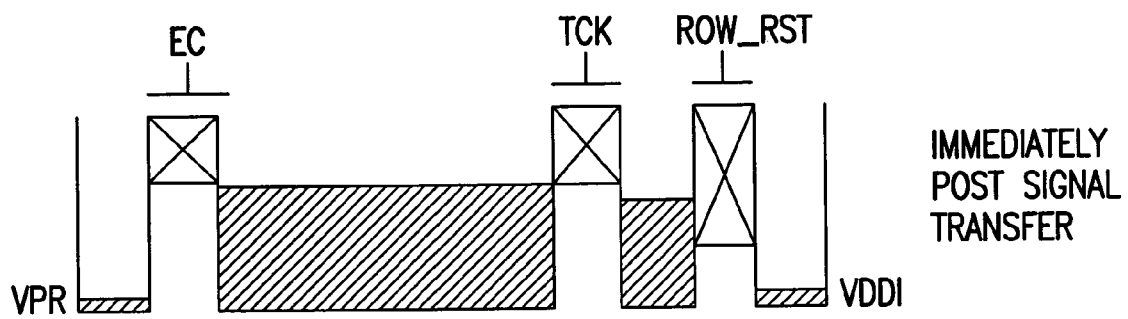

The operation of the new pixel is illustrated in FIGS. 3A through 3C. The integration and transfer operation is illustrated in FIG. 3A. This is what eliminates rolling shutter operation.

In FIG. 3A, the photosite (e.g., the well between the preset gate transistor and the transfer gate transistor) has been integrating photocharge for a period of time. In FIG. 3B, TCK is clocked high to causes the photocharge to be transferred to the sense node (e.g., junction 18 or the well between the transfer gate transistor and the reset gate transistor) which is also a part of pixel 10. In FIG. 3C, TCK is clocked back to low. The photocharge is now stored on the sense node for readout. The sense node is covered with a light shield (not shown for clarity) and hence the photosite (junction 14) can immediately begin to accumulate photocharge from the next exposure period without altering the charge stored on the sense node. In practice the photosite to sense node operation will take place for all pixels in the frame at the same time. After the transfer operation, the individual sense nodes can be read out in sequence.

Figure 2A:
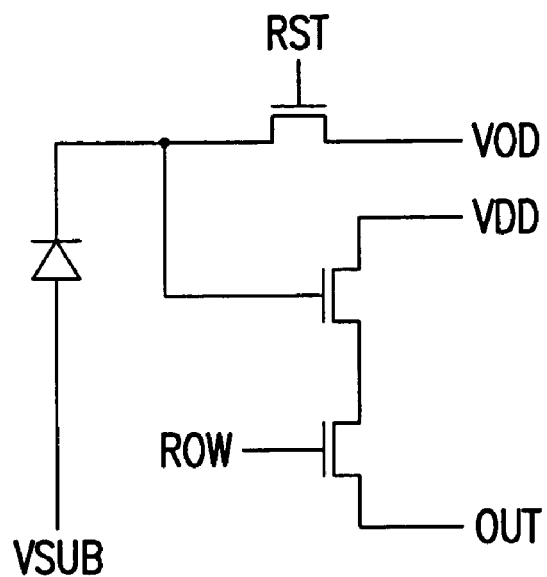
FIGS. 2A and B are circuit schematics of known three and four transistor pixels, respectively.

This architecture eliminates the "rolling shutter" phenomenon associated with conventional CMOS pixels (the "3T" pixel illustrated in FIG. 2A). The rolling shutter issue can be described with the aid of FIGS. 4A, 4B, 5A, 5B, 6A and 6B. These figures illustrate the sequence of row readouts and the associated integration times sensed by each row in the array.

Figure 6A:
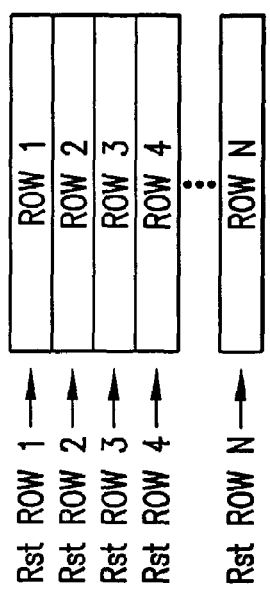
FIGS. 6A and 6B are timing diagrams showing the timing sequence for an array of N rows configured with a known 3T pixel.
Figure 6B:
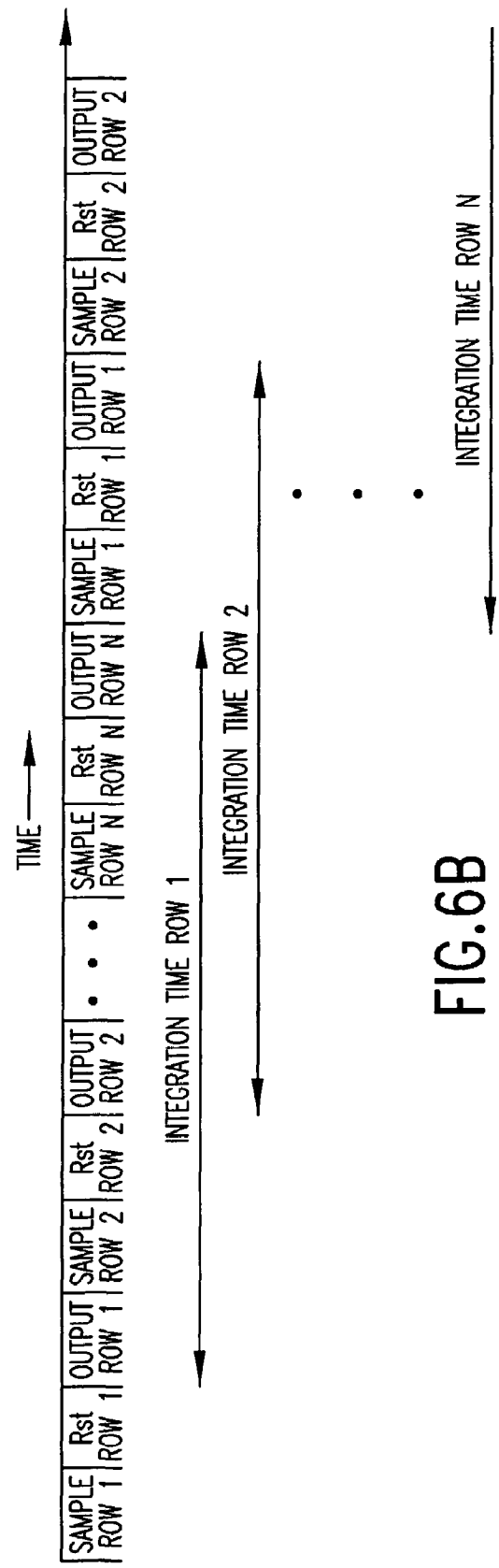

In a conventional CMOS "3T" pixel, the photosite is both the charge collection site and the sense node. Consequently, when operating at the maximum readout speed, the integration time is the time interval between successive reads of the same row as depicted in FIGS. 6A and 6B. The integration time period for each row begins and ends at a different time so that a "rolling shutter" is created. Note the staggered integration times depicted in FIG. 6B. If a single exposure were collected of a fast moving scene (e.g. a pencil being waved back and forth rapidly in front of the camera), the stored image would not display a straight pencil, but rather a curvy pencil since different rows were exposed while the pencil was in different locations. It follows that an external shutter must be used with a conventional CMOS image to capture fast changing scenes.

The "5T" pixel eliminates this issue by constructing each pixel to have a separate well for integration of photocharge (i.e., junction 14) and for the storage of the charge collected during a frame (i.e., junction 18). The storage node is light shielded and hence the amount of charge stored on the storage/sense node is unaffected by the image light which falls on the sensor.

Figure 2B:
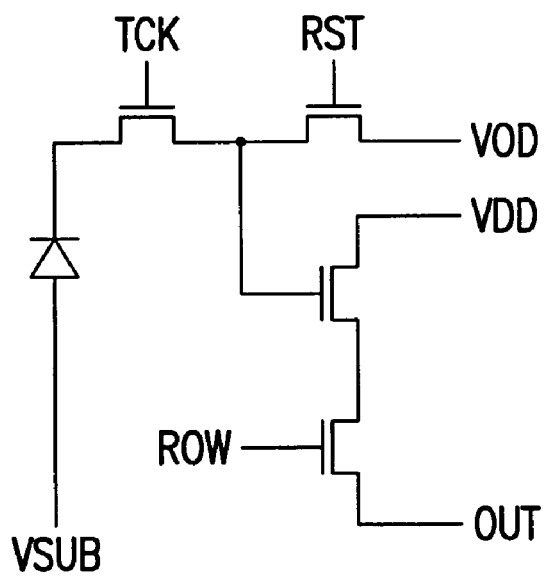
Figure 5A:
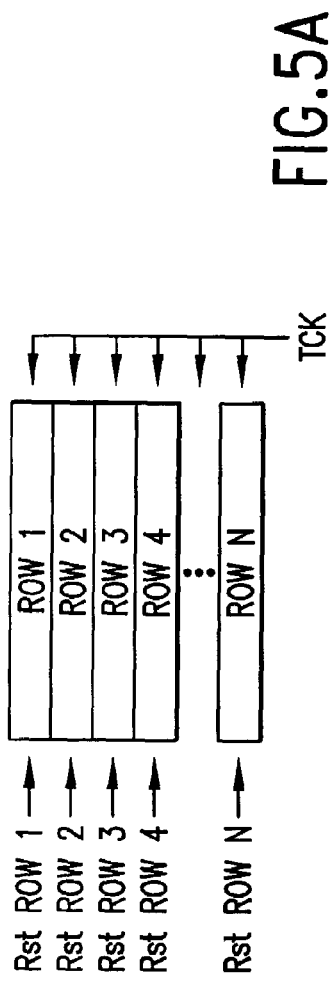
FIGS. 5A and 5B are timing diagrams showing the timing sequence for an array of N rows configured with a known 4T pixel.
Figure 5B:
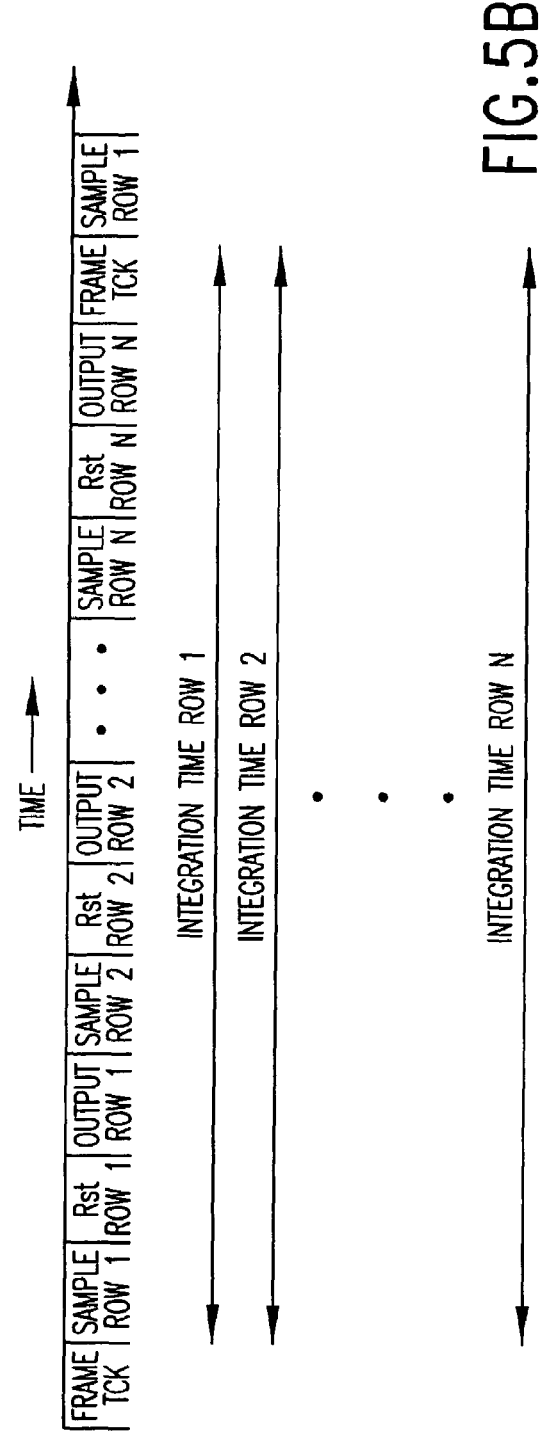

The rolling shutter issue can also be eliminated with a "4T" pixel array (FIG. 2B) as illustrated in FIGS. 5A and 5B; however, antiblooming functionality may not be achieved at the same time. Here the transfer gate transistors are all clocked at the same time and the charge in the photosites is transferred within each pixel to a respective pixel sense node. If the sense node is light shielded, the charge on the sense nodes can be read out at any time during the time interval when the next frame image is being integrated. The first issue with this arrangement is that the minimum duration of the charge collection time (integration time) in the photosite is fixed to, and defined by, the readout time for the array. This may be too long of an exposure time for fast moving scenes. However, this problem can be worked around to some degree. After the array is read out, the transfer gate electrodes and reset gate electrodes can all be activated then turned off to preset the photodiode potential. The photosites can then collect charge for an arbitrarily short period before doing the frame transfer operation, after which, the photocharge can be subsequent readout. The limitation with this approach is that the maximum effective frame rate is necessarily reduced. Another issue with using a known "4T" pixel in this manner is that for high scene illumination (which is usually the case when imaging fast moving scenes) any particular photosite may fill to the top during the frame readout operation. The charge will then spill out of the photosites (i.e., a blooming effect) and contaminate the signal still to be read out on the sense node. The 4T pixel can be clocked to allow for antiblooming and exposure control functionality, but not without contaminating the charge stored on the storage/sense node.

In contrast, the "5T" pixel adds a dedicated exposure control gate transistor 22, and therefore, allows for non-rolling shutter operation and for antiblooming and exposure control functionality at the same time. Note that a "5T" pixel can be made to behave like a "4T" pixel by holding the exposure control gate transistor inactive, and can be made to behave as a "3T" pixel by holding the exposure control gate transistor inactive and the transfer gate transistor always active.

An additional feature of the present invention is the manner in which the photosite is reset. The most straightforward approach would be to hold VPR high and to then clock the voltage EC to a high level and then back to a low level. When voltage EC is high, charge in the photosite would spill to the VPR drain until the voltage on the photosite is equal to the high voltage of voltage EC minus the threshold voltage of the exposure control transistor. By arranging the high level EC on the gate electrode of the exposure control transistor so that it is slightly smaller than the high level on clock voltage TCK, the pixel clocking processes will always transfer some charge to the storage node when clock voltage TCK is clocked high. This "extra" charge is referred to as "fat zero" charge.

The photosite operation as described above is referred to as a "soft" reset. The "soft" reset is defined to be when the level to which the photosite falls during reset is governed by subthreshold current flow across the preset transistor (exposure control transistor 22 in FIG. 1 in the present invention). Hence the final voltage on the photosite is a function of the duration of the voltage EC high pulse and of the voltage level on the photosite just prior to clocking the voltage EC high. This results in an undesired phenomenon known as image lag.

An alternative preferred way, to reset the photodetector is to clock the voltage EC high and then low while voltage VPR is maintained at a sufficiently low voltage that the potential beneath the preset gate electrode becomes larger than voltage VPR during the reset operation (i.e., current freely flows between drain VPR and the photodetector and is not limited by a subthreshold voltage of a transistor). This ensures that the voltage on the photodetector becomes exactly voltage VPR, and this is referred to as a "hard" reset.

However, the transfer across transfer gate transistor 16 (FIG. 1) is still "soft" in nature (i.e., after a transfer, the photodetector voltage will move to a voltage equal to the high TCK voltage minus the threshold voltage of the transfer gate transistor). Therefore, the collected charge transferred to junction 18 (i.e., a sense node or storage node) is still "soft". Since the threshold voltages of transistors vary across the chip, the magnitude of the fat zero signal will vary across the chip. This phenomenon is known as a fixed pattern noise (FPN). The present invention takes advantage of the fact that spatial variations in the threshold voltage of transistors will be smaller as between transistors within small area of the same pixel than will be the variations in the threshold voltage of transistors across the whole circuit array.

Figure 3D:
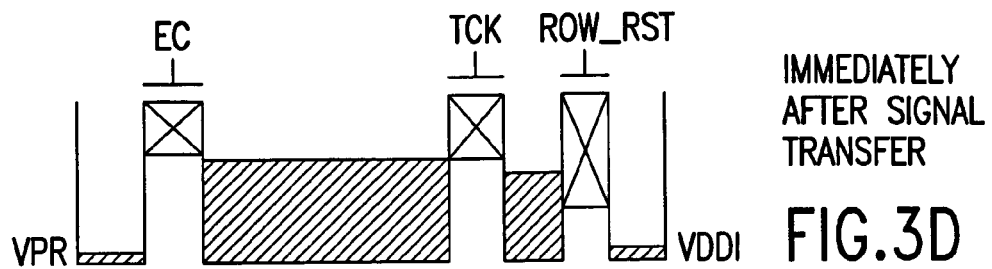
FIGS. 3D through 3H are potential diagrams illustrating the hard and soft reset sequence of the pixel according to the invention.
Figure 3E:
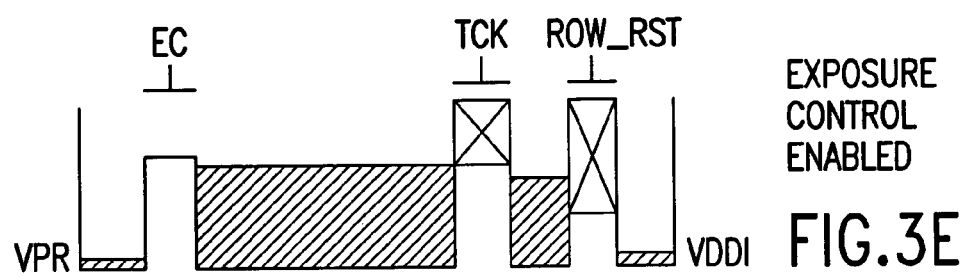
Figure 3F:
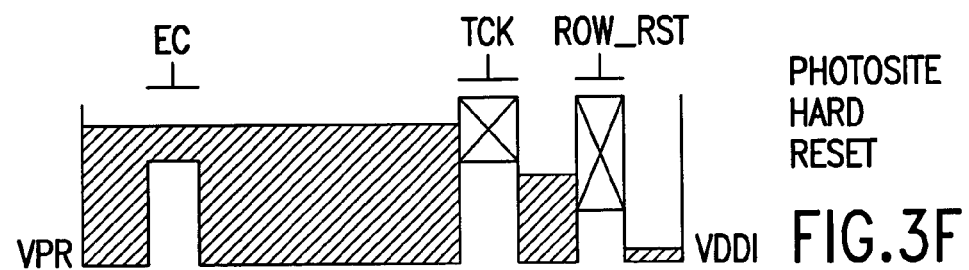
Figure 3G:
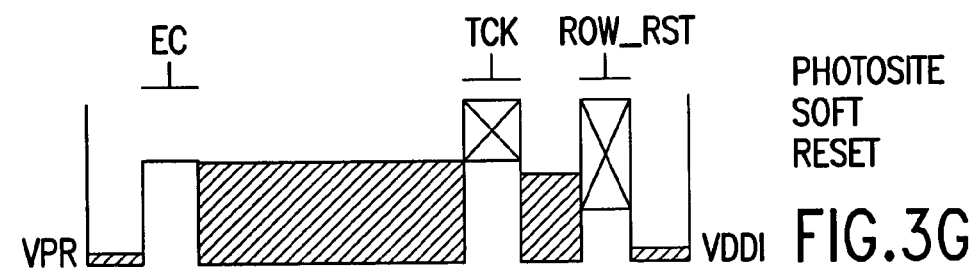
Figure 3H:
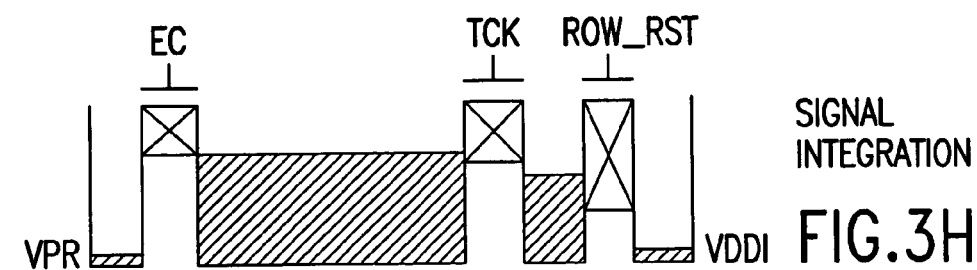
Figure 4A:
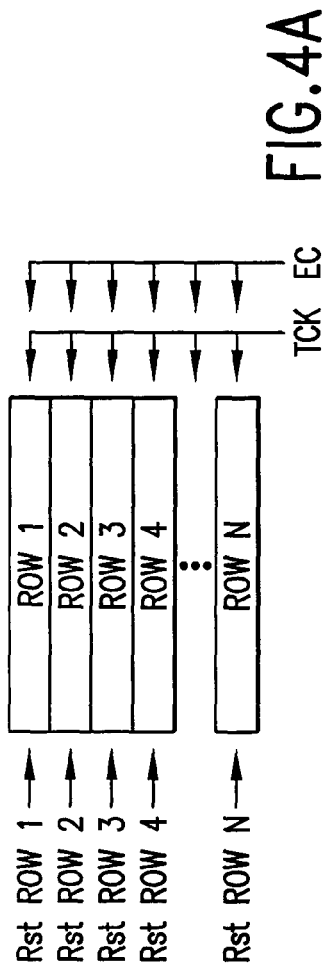
FIGS. 4A and 4B are timing diagrams showing the timing sequence for an array of N rows configured with a 5T pixel of the present invention.
Figure 4B:
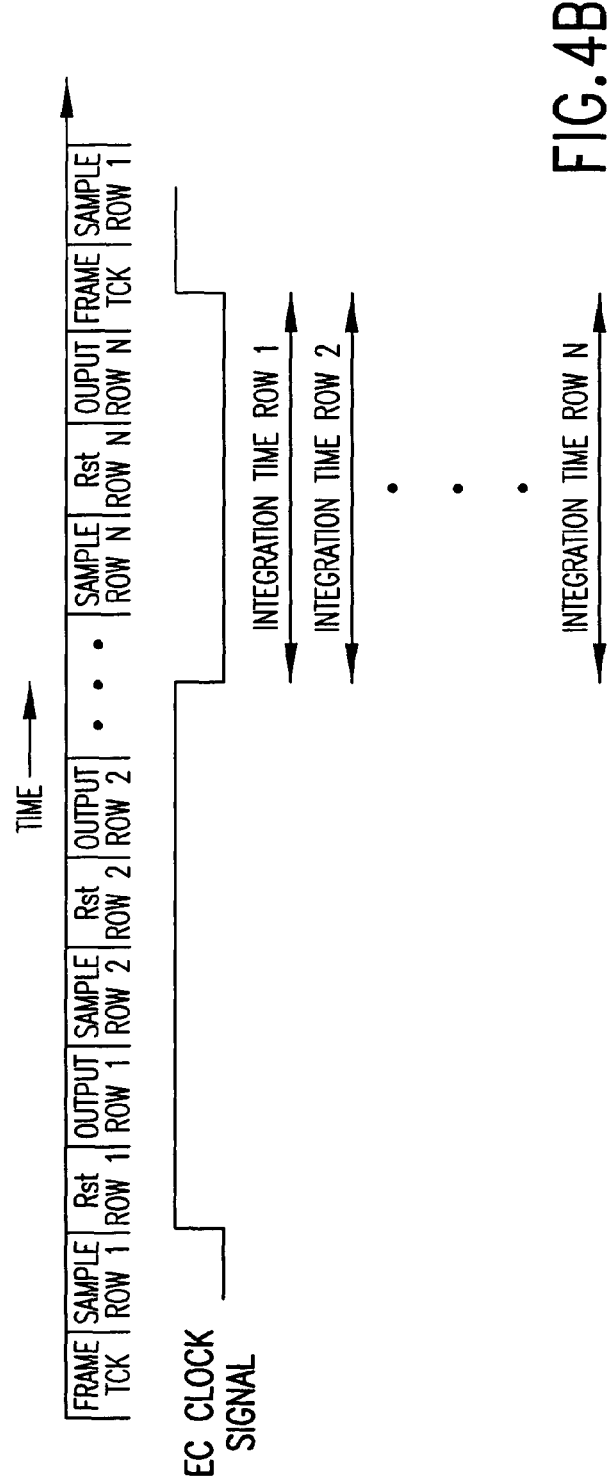

The solution offered in the present invention is to perform a "hard" reset immediately followed by a "soft" reset as illustrated in FIGS. 3D through 3H. FIG. 3D illustrates the pixel immediately after the signal charge transfer from the photosite to the sense node. In FIG. 3E, the photosite reset begins when voltage EC is clocked high. Note that the high level on voltage EC is just slightly lower than the high level on voltage TCK. In FIG. 3F, preset voltage VPR is clocked low. Electron charge transfers into the photosite until the photosite to be reset has a voltage equal to voltage VPR (i.e., a "hard" reset). In FIG. 3G, voltage VPR is clocked high again, at which point, excess electron charge is spilled from the photosite into drain VPR ("soft" reset) and drained away. This intentionally sets the photosite level to a level that is proportional to the local value of the threshold voltage. Since spatial variations in the threshold voltage of transistor 5 will be smaller within a single pixel than across the array, the portion of the "soft" preset voltage attributed to the transistor threshold will be substantially removed later during readout by the threshold voltage of transfer gate transistor 16. The duration of the high pulse to the EC clock is to be equal to the duration of the high pulse on the TCK gate after integration to ensure that lag is minimized. This "hard/soft" reset sequence eliminates lag due to the reset operation, and minimizes the variations across the array in the magnitude of the fat zero signal (i.e. reduces FPN). In FIG. 3H, photo-charge integration is resumed. Without this approach, the user either sees large FPN (i.e. hard reset only) or sees large image lag (i.e. soft reset only). Note that the sense node can be "hard" reset independently of what type of reset operation is used for the photosite.

The most flexible arrangement to achieve this process is illustrate in FIG. 1. However some biases may be ganged together (e.g., voltage VOD and/or voltage VPR may be tied to voltage VDD). A hard reset can be ensured by setting the drain voltage VOD to be lower than the high level of the channel voltage beneath reset gate transistor 20.

Figure 7E:
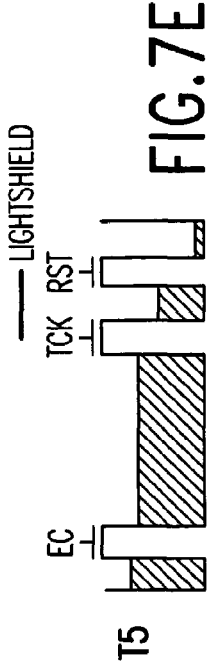
FIGS. 7A through 7H are potential diagrams of the sense node reset timing and its place in the pixel sensing cycle.
Figure 7F:
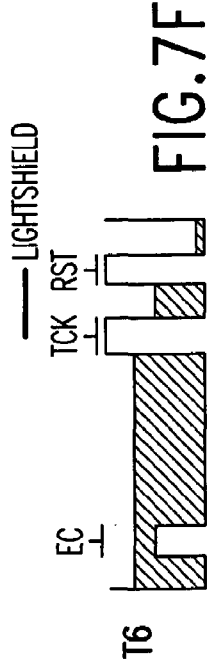
Figure 7G:
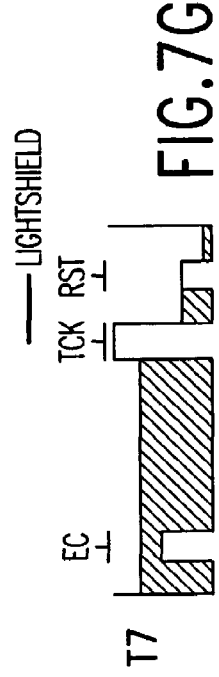
Figure 7H:
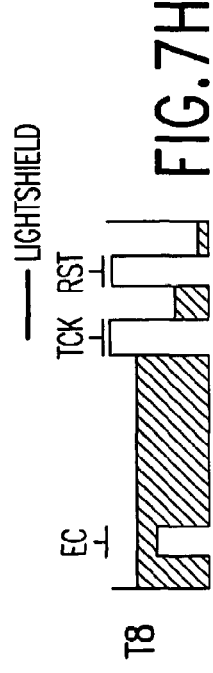
Figure 7A:
Figure 7B:
Figure 7C:
Figure 7D:

In FIG. 7A, at time T1, voltage EC is at its high level while voltage VPR is low so that the photosite is filled with charge. In FIG. 7B, at time T2, voltage EC returns low to isolate the charge in the photosite from drain VPR. In FIG. 7C, at time T3, charge accumulates in the isolated photosite during the integration period. In FIG. 7D, at time T4, voltage TCK becomes high to cause accumulated photocharge to transfer to the sense node from the photosite. In FIG. 7E, at time T5, voltage TCK becomes low and the sense node becomes isolated from the photosite. In FIG. 7F, at time T6, the readout cycle (which is non-destructive) begins. In FIG. 7G, at time T7 after the readout cycle ends (at least ends for the particular pixel), the sense node (junction 18) is reset to output drain voltage VOD by pulsing voltage RST to a high voltage to turn on reset transistor 20. In FIG. 7H, at time T8, voltage RST returns to a low voltage to again isolate the sense node from output drain voltage VOD. During the end of the cycle (T6, T7 and T8) and in the beginning of the cycle (T1) voltage EC is maintained at a high level and preset voltage VPR is maintained at a low level so that the photodetector is "hard" reset to a level of preset voltage VPR at its low level.

The 5T pixel can be implemented with a photodetector constituted by either a pinned photodiode or a surface gated diode so that the photodetector can be fully depleted upon charge transfer from the photodetector to the sense node and the exposure control transistor drain. The photodetector can be implemented with an N well implanted region (as in a buried channel configuration) or an n+ implanted region (as in a surface channel configuration). This would eliminated all issues associated with fat zeros, image lag, and most importantly would remove all sensitivity to pixel to pixel variations in the threshold voltage beneath the transfer gate transistor gate electrodes that show up as fixed pattern noise.

Persons skilled in the art will appreciate in light of these teachings that plural pixels as described above are incorporated into a sensor that includes control circuitry to control the pixel operations. Persons skilled in the art in light of these teaching will appreciate that the construction of control circuitry sufficient to generate the clock signals and control voltages at the above described voltage levels and with the above described timing to affect the operation of the sensor can be made or adapted from known control circuits.

The above described novel pixel is suitable for non-rolling shutter and non-rolling shutter with antiblooming and exposure control applications. It is suitable for low lag and low fat zero FPN applications independent of non-rolling shutter operation. It is suitable for use in any area device for high speed motion capture.

In an alternative embodiment, a sensor includes control circuitry and a plurality of pixels where each pixel includes five transistors, a photodetector and a storage node. A first transistor (transistor 16) of each pixel is coupled between a respective photodetector and a respective storage node. A second transistor (transistor 20) of each pixel is coupled between the respective storage node and an output drain voltage. A third transistor (transistor 22) of each pixel is coupled between the respective photodetector and a pixel reset drain. The control circuitry is capable of controlling the first transistor to transfer a prior photodetector charge from the photodetector to the storage node. The control circuitry is further capable of applying a pixel reset voltage to the pixel reset drain and controlling the third transistor to set a first photodetector charge on the photodetector based on the pixel reset voltage. In a particular aspect of the present embodiment, a clock voltage applied to a gate electrode of the first transistor is greater than a resultant channel voltage beneath the gate electrode of the first transistor by a transistor threshold voltage. The pixel reset voltage is lower than the channel voltage when the clock voltage is at a high state. The control circuitry is the typical type of timing generators that are used in sensor integrated circuits but could be any type of timing generator that can control the transistors and voltages to affect the processes discussed herein.

The photodetector is reset with a fat zero charge prior to the start of integration. The pixel reset drain voltage is maintained at a constant voltage level (not clocked) that is lower than a channel voltage beneath the gate electrode of the third transistor when the signal applied to the gate electrode of the third transistor is at its high level. For example, VDD is applied to the gate. To reset the photodetector, the signal on the gate electrode of the third transistor is clocked high then low, and the photodetector is then reset to the pixel reset voltage. The pixel reset drain voltage is also maintained lower than a channel voltage beneath the gate electrode of the first transistor when the signal applied to the gate electrode of the first transistor is at its high level to transfer integrated charge in the photodetector to the storage node. The difference between the pixel reset drain voltage and the channel voltage beneath the gate electrode of the first transistor when the signal applied to the gate electrode of the first transistor is at its high level is the fat zero voltage. The low level of the signal applied to the gate electrode of the third transistor is slightly higher than the low level of the signal applied to the gate electrode of the first transistor to allow for antiblooming functionality.

The photodetector blooms across the photodetector reset gate (third transistor) when the voltage on the photodetector falls below the channel potential beneath the third transistor. For example, the third transistor might be set to 0.8 volts during the integration phase which would produce a channel potential beneath the gate of perhaps 0.3 volts (assuming a transistor threshold voltage of 0.5 volts). The photodetector might start at a reset voltage of 1 volt (reset voltage on the drain of third transistor is connected permanently pixel reset voltage that is set by connection to 1 volt) The voltage on the photodetector would decrease with incoming light due to generation of photoelectrons until it passed below the 0.3 volt channel potential beneath the third transistor at which point the excess charge would bloom and transfer over to the drain of the third transistor.

As long as the high clock state of the clock applied to the gate electrode of the third transistor results in a channel potential beneath the gate electrode of the third transistor that is higher than the pixel reset drain voltage, the photodetector voltage is reset to the pixel reset drain voltage. For example, when a high clock state at 2.5 volts is applied to the gate electrode of the third transistor, a channel potential beneath the gate electrode is produced in the range of 2 volts (with a 0.5 volt transistor threshold). While the pixel reset voltage is held to a 1 volt level, charges will spill across the third transistor to set the photodetector to the voltage of the pixel reset voltage.

In this example, a constraint on the pixel reset drain voltage is that the pixel reset drain voltage must be less than the channel potential beneath the gate electrode of the first transistor when the clock signal on the gate electrode of the first transistor is clocked to its high level during a charge transfer operation (to transfer charge from the photodector to the storage node). For example, the pixel reset drain voltage is held at 1 volt and the gate electrode of the first transistor is clocked to a high level of 1.6 volts which would create a channel potential beneath the gate electrode of the first transistor during the transfer operation in the range of 1.1 volts (assuming a threshold voltage of 0.5 volts). What this means is that with the photodetector initially reset to 1 volt, and in the absence of any light impinging on the photodetector, the subsequent transfer operation (through the first transistor) would always spill 0.1 volts worth of charge from the photodetector to the storage node. This 0.1 volts is what is called the "fat zero" charge. It ensures that some non-zero charge is always transferred, even in the absence of a light signal.

Having described preferred embodiments of a novel five transistor CMOS pixel (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by Letters Patent is set forth in the appended claims.

What is claimed is:

1. A pixel comprising five transistors, a photodetector and a storage node, wherein:
    a first transistor is coupled between the photodetector and the storage node;
    a second transistor includes a second transistor source and a second transistor drain, the second transistor source being coupled to the storage node, the second transistor drain being coupled to an output drain voltage;
    a third transistor includes a third transistor drain, the third transistor being coupled between the photodetector and a pixel reset voltage, the third transistor drain being coupled to the pixel reset voltage; and
    the pixel reset voltage is different than the output drain voltage.

2. The pixel of claim 1, wherein the photodetector comprises a pinned photodiode.

3. The pixel of claim 1, wherein the photodetector is a photodiode.

4. The pixel of claim 1, wherein the photodetector comprises one of an N well implanted region and an n+implanted region.

5. The pixel of claim 1, wherein the five transistors of the pixel are configured to be capable of being fully depleting charge from the photodetector upon charge transfer from the photodetector to at least one of the storage node and the pixel reset voltage.

6. The pixel of claim 1, wherein:
    the first transistor is coupled in a configuration with other transistors of the five transistors that is operable to eliminate a rolling shutter artifact; and
    a third transistor coupled in a configuration with other transistors of the five transistors that is operable to affect an exposure control and antiblooming function in the pixel.

7. The pixel of claim 6, further comprising a light shield over the storage node.

8. A sensor comprising a pixel that includes five transistors, a photodetector and a storage node, wherein:
    a first transistor is coupled between the photodetector and the storage node;
    a second transistor is coupled between the photodetector and a pixel reset voltage;
    a gate electrode of the first transistor is coupled to a transfer clock signal, the transfer clock signal having a low state and a high state;
    a gate electrode of the second transistor is coupled to a pixel reset clock signal, the pixel reset clock signal having a low state and a high state;
    the transfer clock signal and the pixel reset clock signal are both at a low state during a charge integration interval; and
    the high state of the transfer clock signal is greater than the high state of the pixel reset clock signal.

9. The sensor of claim 8, further comprising control circuitry, wherein:
    the control circuitry is capable of initially setting a pixel reset voltage lower than the high state of the pixel reset clock signal while the transfer clock signal is at the low state;
    the control circuitry is further capable of thereafter increasing the pixel reset voltage to be higher than the high state of the pixel reset clock signal; and
    the control circuitry is further capable of subsequently switching the pixel reset clock signal to the low state at a beginning of the charge integration interval while the transfer clock signal remains at the low high state.

10. A sensor comprising control circuitry and a plurality of pixels where each pixel includes five transistors, a photodetector and a storage node, wherein:
    a first transistor of each pixel is coupled between a respective photodetector and a respective storage node;
    a second transistor of each pixel is coupled between the respective storage node and an output drain voltage;
    a third transistor of each pixel is coupled between the respective photodetector and a pixel reset voltage;
    the control circuitry is capable of controlling the first transistor of each pixel to transfer a prior charge from the photodetector to the storage node at a beginning of a first readout interval; and
    the control circuitry is further capable of controlling the first and third transistors of each pixel to integrate a first charge on the respective photodetector during an integration fraction of the first readout interval, the integration fraction being less than a whole of the first readout interval.

11. The sensor of claim 10, wherein the control circuitry is further capable of controlling the third transistor of each pixel and the pixel reset voltage to spill and drain away photodetector charge from the photodetector of each pixel when a voltage corresponding to the respective photodetector charge falls below an anti-blooming threshold during the integration fraction of the first readout interval.

12. The sensor of claim 11, wherein the control circuitry is further capable of controlling the third transistor of each pixel and the pixel reset voltage to reset a voltage on the photodetector to the pixel reset voltage during an exposure control fraction of the first readout interval.

13. A sensor comprising control circuitry and a plurality of pixels where each pixel includes five transistors, a photodetector and a storage node, wherein:

a first transistor of each pixel is coupled between a respective photodetector and a respective storage node;

a second transistor of each pixel is coupled between the respective storage node and an output drain voltage;

a third transistor of each pixel is coupled between the respective photodetector and a pixel reset drain;

the control circuitry is capable of controlling the first transistor to transfer a prior photodetector charge from the photodetector to the storage node; and the control circuitry is further capable of applying a pixel reset voltage to the pixel reset drain and controlling the third transistor to set a first photodetector charge on the photodetector based on the pixel reset voltage.

14. The sensor of claim 13, wherein a clock voltage applied to a gate electrode of the first transistor is greater than a resultant channel voltage beneath the gate electrode of the first transistor by a transistor threshold voltage; and the pixel reset voltage is lower than the resultant channel voltage when the clock voltage is at a high state.

* * * * *